(12) United States Patent
Waxham

(10) Patent No.: US 7,918,474 B2
(45) Date of Patent: Apr. 5, 2011

(54) BICYCLE DROPOUT ASSEMBLY

(75) Inventor: Raymond E. Waxham, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 50 days.

(21) Appl. No.: 12/389,536

(22) Filed: Feb. 20, 2009

(65) Prior Publication Data

US 2010/0213685 A1 Aug. 26, 2010

(51) Int. Cl.
*B62K 25/02* (2006.01)
(52) U.S. Cl. .................... 280/288; 280/281.1; 301/110.5
(58) Field of Classification Search ............... 280/281.1, 280/274, 284, 288; 301/110.5, 124.2, 125
See application file for complete search history.

(56) References Cited

U.S. PATENT DOCUMENTS

| | | | | |
|---|---|---|---|---|
| 472,005 | A | * | 3/1892 | Vale .............................. 280/274 |
| 565,819 | A | * | 8/1896 | Weed ............................... 474/47 |
| 654,182 | A | * | 7/1900 | Rupsch .......................... 280/288 |
| 3,717,361 | A | | 2/1973 | Vanderpool |
| 4,850,939 | A | | 7/1989 | Chilcote et al. |
| 4,889,354 | A | | 12/1989 | Wen |
| 4,952,196 | A | | 8/1990 | Chilcote et al. |
| 5,549,315 | A | * | 8/1996 | Ashman ......................... 280/279 |
| 5,909,889 | A | | 6/1999 | Larson |
| 6,024,367 | A | | 2/2000 | Tsan |
| 6,074,119 | A | | 6/2000 | Schlanger |
| 6,129,645 | A | | 10/2000 | Burrows |
| 6,186,918 | B1 | | 2/2001 | Yoo |
| 7,124,789 | B2 | | 10/2006 | Nakano |
| 7,240,969 | B2 | | 7/2007 | Gu |
| 2004/0180741 | A1 | | 9/2004 | Hunter, Jr. |
| 2005/0098973 | A1 | | 5/2005 | Pace |
| 2006/0116227 | A1 | | 6/2006 | Mercat et al. |
| 2006/0158022 | A1 | | 7/2006 | Nicolai |
| 2007/0052285 | A1 | | 3/2007 | Montague et al. |
| 2007/0108724 | A1 | * | 5/2007 | Julliard et al. ............. 280/281.1 |
| 2008/0036288 | A1 | | 2/2008 | Lund |

FOREIGN PATENT DOCUMENTS

| | | | |
|---|---|---|---|
| EP | 0336033 A1 | | 10/1989 |
| GB | 2214881 | * | 9/1989 |
| GB | 2451647 | * | 11/2009 |
| WO | WO 89/03951 | | 5/1989 |
| WO | WO 92/01174 | | 1/1992 |

* cited by examiner

*Primary Examiner* — Anne Marie M Boehler
(74) *Attorney, Agent, or Firm* — Boyle Fredrickson, S.C.

(57) ABSTRACT

A bicycle wheel dropout assembly that includes a split component axle mount assembly. An inboard and an outboard component of the axle mount assembly cooperate with overlapping portions of a respective seat stay and chain stay and are rotatably engaged therewith. An axle passes between adjacent mount assemblies and is offset with respect to an axis of rotation of the respective mount assemblies. The axle mount assemblies secure the overlapping portions of the seat stay and the chain stay relative to one another and support the axle in a manner that is convenient for drive train maintenance and/or servicing.

20 Claims, 6 Drawing Sheets

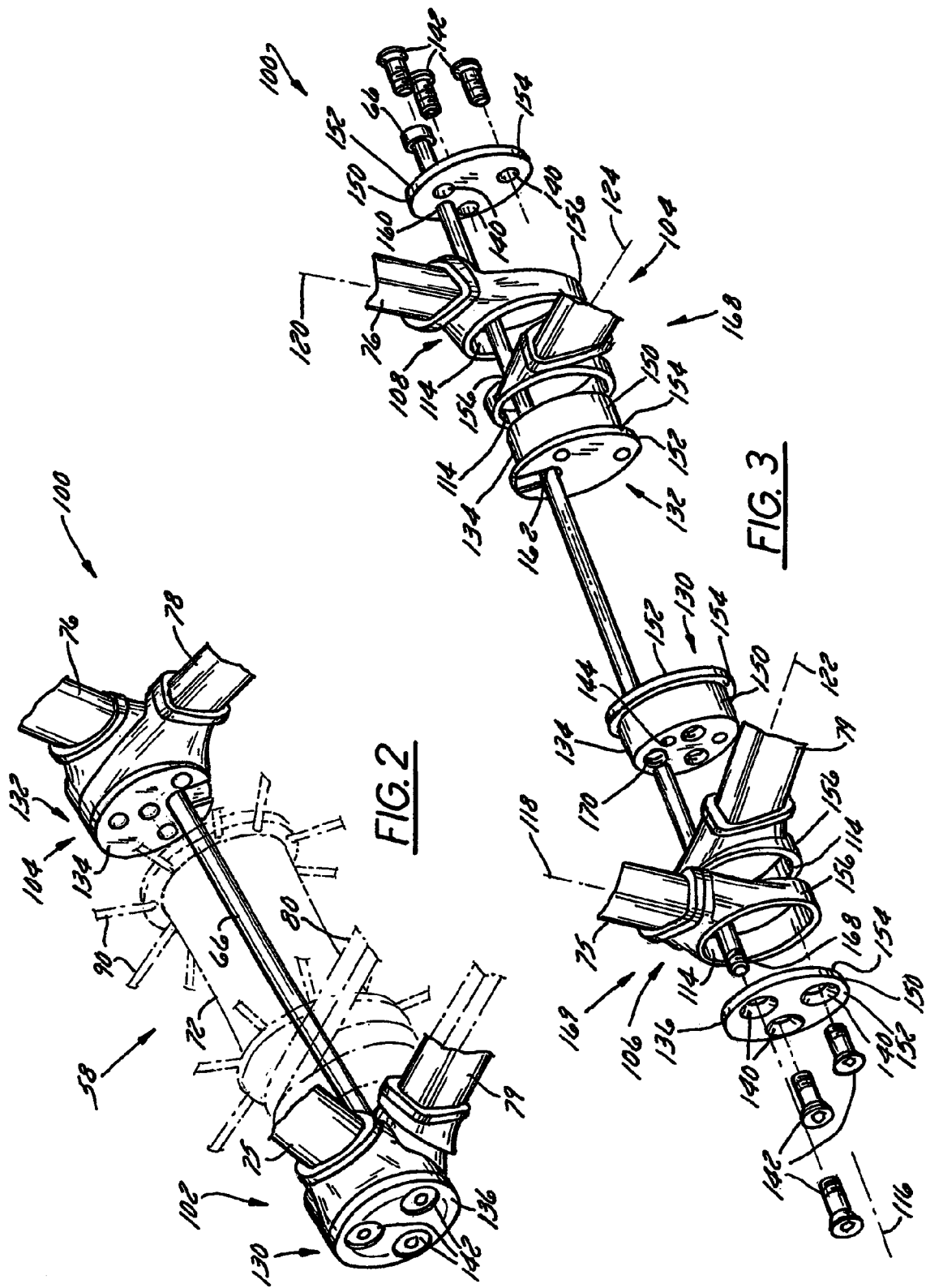

BICYCLE DROPOUT ASSEMBLY

BACKGROUND OF THE INVENTION

The present invention relates to bicycle wheel mount assemblies and, more specifically, to a bicycle dropout assembly that allows splitting of the chain and seat stays without altering a relation of an axle relative to a bicycle and that provides for tensioning of the drive system in a convenient manner.

Commonly, the front and rear tires of a bicycle are supported by respective drop out assemblies that provide the connection between a skewer, axle or hub of a wheel assembly and the frame of the bicycle. With respect to the rear wheel assembly, a flexible or endless drive, such as a belt or chain, extends between a crankset associated with the pedals, and a gear set that is drivingly associated with the rear wheel. Those skilled in the art will appreciate the structural and vernacular distinctions with respect to bicycle drive systems equipped with a belt as compared to those equipped with a chain. That is, it is appreciated that many belt driven drive system are equipped with pulleys and/or splined drive members as compared to the many toothed gears associated with chain driven systems.

As used herein, a drive member of the drive train is that portion of the bicycle drive system that is connected to, and directly driven by, the bicycle pedals. A flexible drive or flexible drive member, such as a chain or belt, is operatively associated with the drive member and communicates a drive force to a driven member. The driven member is operatively associated with a wheel assembly so that rotation of the driven member rotates the wheel assembly. Either or both of the drive and driven member may include more than one drive surface whose interaction with the flexible drive member alters the gearing of the drive train.

Regardless of the type of flexible drive associated with the drive system, the endless drive must be appropriately adjusted so as to maintain a desired operational interaction between the respective drive and driven members of the drive system and the endless drive member. Commonly, with chain and belt systems, the endless drive is adjusted or "tensioned" by adjusting the position of the rear wheel axle relative to an axis of rotation of the drive member or crankset. Operation of a screw or other adjuster, commonly referred to as a tensioner system, linearly translates the axle relative to the crankset until a desired orientation of the drive system is achieved. Although such systems are generally simple to operate, such systems are not without their respective drawbacks.

Such tensioner systems commonly include a screw or other rotatable operator, a backing plate against which the operator translates, and a slide that interacts with the axle and alters a position of the axle relative to the frame in response to manipulation of the operator. Although such systems are generally simple to operate, they tend to complicate the manufacture of the bicycle and detrimentally increase the overall weight of the bicycle.

Such wheel mounting systems also suffer from an additional drawback related to wheel service. Commonly, if the wheel needs to be removed for service, such as for replacing a tire or the like, the tensioning system is adjusted to allow the hub to be disengaged from the bicycle. Even though the tensioning system is adjusted to remove the wheel assembly from the bicycle, after servicing the wheel, the wheel is generally returned to the same position with respect to the bicycle. Accordingly, servicing of the wheel commonly requires unnecessary manipulation of the tensioning system.

In addition to wheel servicing, both chain and belt equipped drive systems occasionally require servicing and/or replacement of the flexible or endless drive member. Commonly, the endless drive member passes about the crankset and is engaged with the rear sprocket or gear set in a manner such that a chain stay or portion of a frame of the bicycle passes through the endless drive. Said in another way, the crankset is often positioned outboard and the gear set is positioned inboard relative to a drive-side stay assembly. When a chain must be replaced, the user must split the chain by removing a pin from the chain, such as by use of a chain splitting tool, so that two adjacent links of the chain can be disjoined. Although those skilled in the art can become efficient at replacing a chain in the field, provided a replacement chain is on hand, many users are ill-equipped to perform such service in the field, if at all.

Belt based bicycle drive trains present a distinct complication to the servicing of the flexible drive member. Unlike a chain, the endless loop of the belt of the drive train system is not separable. As such, integration of a drive system equipped with a belt with the bicycle requires that portions of the frame that are commonly fixed together be provided in a separable manner.

Others have resolved the issue of passing a frame member through the flexible drive link by rearranging the orientation of the drive system relative to the bicycle. One such solution provides a bicycle assembly wherein the rear wheel gear set is positioned outboard of the drive side chain stay and seat stay assembly. Others provide a cantilevered wheel assembly that is supported by a single fairly robust and substantial seat stay and chain stay assembly. The single seat and chain stay assembly can be positioned between the wheel and the driven member or toward a non-driven side of the wheel assembly. Although such systems improve the serviceability of drive systems equipped with a flexible drive link, such solutions unduly complicate the construction of the bicycle frame and/ or detrimentally increase the overall weight of the bicycle.

Accordingly, there is a need for a bicycle wheel support assembly that provides an efficient yet robust system for tensioning a flexible drive member. There is also a need for a bicycle wheel mount assembly that provides independence between mounting of the wheel assembly to the bicycle and adjustment of the flexible member of the bicycle wheel drive system. There is also a need for a bicycle wheel mounting system that can accommodate an inseparable flexible drive in a manner that does not unduly interfere with the overall construction of the bicycle.

SUMMARY OF THE INVENTION

The present invention provides a bicycle wheel mount assembly that addresses one or more of the problems discussed above. According to one aspect of the invention, a bicycle wheel dropout assembly is disclosed that includes a split component axle mount assembly. An inboard and an outboard component of the axle mount assembly cooperate with overlapping portions of a respective seat stay and chain stay and are rotatably engaged therewith. An axle passes between adjacent mount assemblies and is offset with respect to an axis of rotation of the respective mount assemblies. The axle mount assemblies secure the overlapping portions of the seat stay and the chain stay relative to one another and support the axle in a manner that is convenient for drive train maintenance and/or servicing.

Another aspept of invention useable with one or more of the above aspects discloses a bicycle wheel support assembly that has a chain stay and a seat stay. An axle mount opening is formed in each of the chain stay and the seat stay. The support assembly includes an axle mount assembly that has a first portion that engages the chain stay from a first direction and a second portion that engages the seat stay from a second direction opposite the first direction such that the axle mount assembly secures the chain stay to the seat stay when the axle mount assembly is engaged therewith. The support assembly also allows the chain stay and the seat stay to be separate when the axle mount assembly is removed therefrom. An axle is engaged with a peripheral location of the axle mount assembly so that rotation of the axle mount assembly alters a position of the axle relative to the axle mount opening.

Another aspect of the invention that is useable with one or more of the above aspects discloses a bicycle wheel support assembly that includes a chain stay, a seat stay, and a support opening formed at an overlapping portion of the chain stay and the seat stay. The support opening has an axis that is oriented in a crossing direction relative to a longitudinal axis of a respective chain stay and seat stay. A first support and a second support are rotatably engaged with the support opening from generally opposite directions along the axis of the open and secure together the overlapping portions of the chain stay and the seat stay. An axle opening is formed in at least one of the first support and the second support at a position that is offset in a radial direction from the axis of the support opening. The axle opening is configured to cooperate with a wheel axle so that the wheel axle can be removed from the opening without interfering with an orientation of the axle opening relative to the chain stay and the seat stay.

A further aspect of the invention combinable with one or more of the aspects above discloses a method of mounting a bicycle wheel. At least a driven side of a rear wheel assembly of a bicycle is formed with a chain stay and a seat stay that have separable rear end portions. An axle mount is provided that connects the rear end portions of the chain stay and the seat stay. An axle is engaged with the axle mount so that the axle mount can be rotated relative to the rear end portions of the chain stay and the seat stay to define an operating position of the axle.

Preferably, mount assemblies having one or more of the aspects above include an axle that engages the first and the second portions of the mount assemblies. Preferably, one or more fasteners are accessible from an outboard position and allow separation of the respective portions of the mount assemblies. More preferably, the axle can be removed from the mount assembly in a manner that does not alter the orientation of the mount assembly relative to the bicycle frame. Preferably, the axle slidably cooperates with a mount assembly on one side of a wheel assembly and threadingly cooperates with a mount assembly positioned on an opposite side of the wheel assembly.

The wheel mount assemblies disclosed herein are constructed in accordance with one or more of the above aspects are applicable to bicycle drive systems having either of a belt or a chain flexible drive member.

BRIEF DESCRIPTION OF THE DRAWINGS

The drawings illustrate one preferred embodiment presently contemplated for carrying out the invention. In the drawings:

FIG. 2 is a perspective view of the wheel mount assembly shown in FIG. 1 with a hub portion of the wheel shown in phantom;

FIG. 3 is a perspective exploded view of the wheel mount assembly shown in FIG. 2 with the wheel removed from the assembly;

Figure 1:
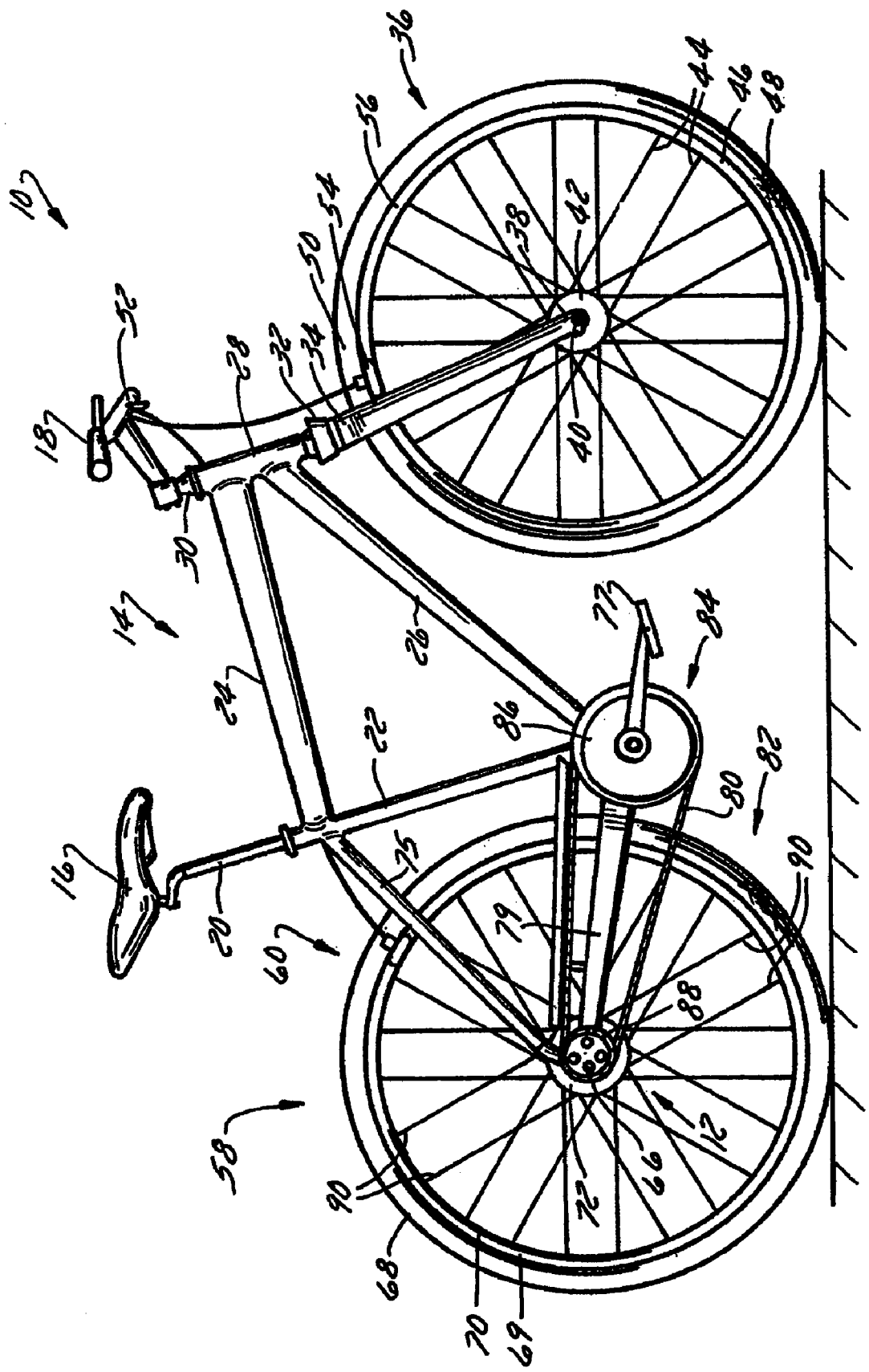
FIG. 1 is a side elevation view of a bicycle equipped with a wheel mount assembly according to the present invention.

In describing the preferred embodiments of the invention that are illustrated in the drawings, specific terminology will be resorted to for the sake of clarity. However, it is not intended that the invention be limited to the specific terms so selected and it is to be understood that each specific term includes all technical equivalents that operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENT

FIG. 1 shows a bicycle 10 having at least one wheel mount or wheel support assembly 12 according to the present invention. Bicycle 10 includes a seat 16 and handlebars 18 that are attached to a frame assembly 14. A seat post 20 is connected to seat 16 and slidably engages a seat tube 22 of frame assembly 14. A top tube 24 and a down tube 26 extend forwardly from seat tube 22 to a head tube 28 of frame assembly 14. Handlebars 18 are connected to a stem 30 that passes through head tube 28 and engages a fork crown 32.

A pair of forks 34 extend from generally opposite ends of fork crown 32 and are constructed to support a front wheel assembly 36 at an end of each fork or a fork tip 38. Fork tips 38 engage generally opposite sides of an axle 40 that supports a hub 42 of front wheel assembly 36. A number of spokes 44 extend from hub 42 to a rim 46 of front wheel assembly 36. A tire 48 is engaged with rim 46 such that rotation of tire 48, relative to forks 34, rotates rim 46 and hub 42.

Bicycle 10 includes a front brake assembly 50 having an actuator 52 attached to handlebars 18 and a pair of brake pads 54 positioned on generally opposite sides of front wheel assembly 36. Brake pads 54 are constructed to engage a brake wall 56 of rim 46 thereby providing a stopping or slowing force to front wheel assembly 36. A rear wheel assembly 58 includes a similar rim brake assembly 60 although either of front and/or rear wheel assemblies could be provided with rotor type braking assemblies. Regardless of the specific configuration of the respective braking system, similar to front wheel assembly 36, rear wheel assembly 58 also includes a skewer, shaft, or axle 66 that secures rear wheel assembly 58 to frame assembly 14 of bicycle 10.

Rear wheel assembly 58 includes a tire 68 that is supported by a wheel 69. Wheel 69 includes a rim 70 that is offset from a hub 72 by a number of spokes 74. Alternatively, wheel 69 could include laterally opposite discs that extend between rim 70 and hub 72. Hub 72 cooperates with axle 66 such that wheel 69 rotates about an axis of axle 66 relative to frame assembly 14 during use of bicycle 10. As will be described further with respect to FIGS. 2-7, rear wheel assembly 58 and axle 66 can be selectively pivoted about an axis of wheel support assembly 12 to adjust a flexible member 80 of a drive train 82 of bicycle 10.

Frame assembly 14 includes a pair of seat stays 75, 76 and a pair of chain stays 78, 79 that offset rear axle 66 from a crankset 84 of bicycle 10. As described further below, stays 75, 76, 78, 79 are oriented to generally flank rear wheel assembly 58. Preferably, frame assembly 14 includes a pair of seat stays 75, 76 and a pair of chain stays 79, 78 that are positioned on and support the generally laterally opposite sides of wheel assembly 58. Understandably, it is envisioned that a single chain stay and a single seat stay of robust construction could be provided such that wheel assembly 58 could be mounted in a cantilevered fashion relative thereto.

Crankset 84 includes a set of pedals 77 that are operationally connected to a flexible drive member or flexible member 80 via a drive gear such as a chain ring or sprocket 86. Rotation of flexible member 80 communicates a drive force to a rear section or driven element(s), pulley(s), gear(s) that, in a multi-ratio free-wheel capable configuration, is commonly referred to as a cassette 88. Rotation of flexible member 80 drives cassette 88 which is turn rotates rear wheel assembly 58 so as to propel bicycle 10 in a forward direction.

Understandably, crankset 84 and cassette 88 can each include one or more variable diameter drive train members so that drive train 82 can be operated at a number of gearing ratios. It is further appreciated that the construction of the drive train members will also vary as a function of the type of flexible drive 80. That is, the construction and operation of the drive train members associated with crankset 84 and/or cassette 88 when flexible drive 80 is provided as a belt will most likely not be the same as those associated with drive train systems equipped with a chain. Such differences are readily appreciated. It is envisioned that the present invention be usable with belt and chain, single and multiple gear, bicycle drive train systems. It is further appreciated that use of a wheel mount assembly according to the present invention is not limited to rear wheel assemblies of two-wheel bicycles.

Regardless of the specific modality of flexible drive 80, forward rotation of a driving gear sprocket 86 drives cassette 88 to rotate in a forward direction. Cassette 88 is generally concentrically orientated with respect to rear axle 66. Cassette 88 is operationally connected to hub 72 of a rear wheel 69 of rear wheel assembly 58. A number of spokes 90 extend radially between hub 72 and a rim 70 of rear wheel 69. As is commonly understood, rider operation of pedals 77 drives flexible drive 80 thereby driving rear wheel 69 which in turn propels bicycle 10.

FIG. 2 shows a rear dropout assembly 100 of bicycle 10 with rear wheel hub 72, cassette 88, and flexible drive member 80 shown in phantom therebetween. Referring to FIGS. 2 and 3, dropout assembly 100 includes a drive-side dropout assembly 102 and a non-driven side dropout assembly 104 that cooperate with generally opposite lateral sides of rear wheel assembly 58 so as to generally flank hub 72, cassette 88, and flexible drive member 80.

Each seat stay 75, 76 and each chain stay 78, 79 includes an end portion 106, 108, 110, 112 that overlaps an end portion 106, 108, 110, 112 of an adjacent stay 75, 76, 78, 79. An opening 114 is formed in each end portion 106, 108, 110, 112 of each stay 75, 76, 78, 79. As is commonly understood, end portions 106, 108, 110, 112 of stays 75, 76, 78, 79 forms a generally rearward end of bicycle frame 14. Preferably, each opening 114 is fully encircled by the body of the respective stay 75, 76, 78, 79. Each opening 114 is generally oriented along an axis 116 that extends in a direction that is oriented in a crossing direction relative to a longitudinal axis 118, 120, 122, 124 of the respective stays 75, 76, 78, 79. Preferably, axis 116 is generally perpendicular to the longitudinal axis 118, 120, 122, 124 of stays 75, 76, 78, 79.

Each of drive-side dropout assembly 102 and non-drive side dropout assembly 104 includes an axle mount assembly 130, 132 that cooperate with the openings 114 formed in respective stays 75, 76, 78, 79. Each axle mount assembly 130, 132 includes a first portion or inboard member 134 and a second portion or outboard member 136 that cooperate with the opening 114 of the respective seat and chain stay pairs 75, 79 and 76, 78. As used herein, inboard generally defines those structures and orientations more nearly positioned to a longitudinal centerline of bicycle 10 and outboard locations are generally defined as those locations that are laterally offset from the longitudinal centerline of bicycle 10 as related to associated structures. For example, in FIG. 2, although seat stays 75, 76 are each shown as being positioned outboard relative to an adjacent chain stay 78, 79, it is appreciated that chain stays 78, 79 could be positioned outboard relative thereto.

Each outboard member 136 of axle mount assemblies 130, 132 include a number of openings 140 that cooperate with a number of fasteners 142. Each opening 140 of each outboard member 136 is generally aligned with one of a number of threaded openings 144 formed in an adjacent inboard mount member 134. Fasteners 142, openings 140, 144 cooperate so as secure inboard and outboard adjacent mount members 134, 136 to one another so that the respective seat stay chain stay pair 75, 79; 76, 78 is secured therebetween.

Preferably, each inboard member 134 and each outboard member 136 includes a first portion 150 whose diameter is generally similar to a diameter of opening 114 of the respective nearest adjacent stay 75, 76, 78, 79. Each inboard member 134 and each outboard member 136 includes a second portion 152 whose diameter is generally greater than a diameter of the nearest adjacent opening 114 of the respective stay 75, 76, 78, 79. Such an orientation allows the inboard and outboard member pairs 134, 136 to rotate relative to the stay pairs 75, 79; 76, 78 even when fasteners 142 are engaged therewith.

An interface or lip 154 is formed at the intersection of the respective portions 150, 152 of each respective member 134, 136. Each lip 154 cooperates with a land 156 formed on a facing side of the nearest adjacent stay 75, 76, 78, 79. Fasteners 142 pass through openings 140 formed in each outboard member 136 and threadingly cooperate with openings 144 formed in each inboard member 134 of each respective axle mount assembly 130, 132. Tightening of fasteners 142 brings an associated pair of lips 154 nearer together thereby compressing together respective stay pair 75, 79; 76, 78. Lips 154 also maintain the lateral association of each axle mount assembly 130, 132 relative to the respective stay pair 75, 79; 76, 78.

Axle 66 cooperates with openings 160, 162 formed in non-drive side inboard and non-drive outboard members 134, 136, respectively. Axle 66 includes a threaded distal end 168 that operatively cooperates with a threaded opening 170 formed in one of inboard or outboard drive-side members 134, 136. As described further below, preferably, threaded distal end 168 of axle 66 only engages inboard drive-side member 134 so that outboard drive-side member 136 can be removed from drive-side axle mount assembly 130 so that a gap can be formed between drive side seat stay 75 and drive side chain stay 79. Such manipulation allows user interaction with drive train 82 in a manner that allows the position of axle 66 to be maintained in a position relative to bicycle 10 even though flexible drive member 80 is removed therefrom. This segregation between the drive-side seat and chain stay 75, 79 is commonly referred to as "splitting" of drive-side dropout assembly 102.

Although axle 66 preferably engages only the inboard mount member 134 of drive-side axle mount assembly 130, it is appreciated that axle 66 may extend through each of drive side and non-driver-side axle mount assemblies 130, 132 and cooperate with engage a threaded fastener, such as a nut at a position generally outboard with respect to either of axle mount assemblies 130, 132. Preferably, axle 66 cooperates with axle mounts assemblies 102, 104 in a manner such that the position of axle 66 relative to bicycle 10 is maintained even when dropout assembly 102 is split.

The lateral position of each respective axle mount assembly 130, 132 is generally fixed with respect to respective drive-side stays 75, 79 and non-drive side stays 76, 78, when one or more of fasteners 142 are even loosely engaged between inboard and outboard members 134, 136. That is, drive-side stays 75, 79 are preferably only slightly compressed together when inboard axle mount members 134, 136 are not snuggly or fixedly connected via fasteners 142. Prior to full tightening fasteners 142, the connected inboard and outboard axle mount members 134, 136 are generally rotatable about axis 116 of openings 114. Furthermore, as shown in FIG. 3, the rearward directed portion of seat stays 75, 76 are separate from chain stays 78, 79 such that a gap 169 can be formed between adjacent stays 75, 79 and 76, 78 when the inboard member 134 and outboard member 136 of axle mount assemblies 130, 132 are disengaged from one another. As described further below, such a construction allows drive side stays 75, 79 to be split for the convenient introduction of a portion of flexible drive member 80 therebetween.

Figure 6:
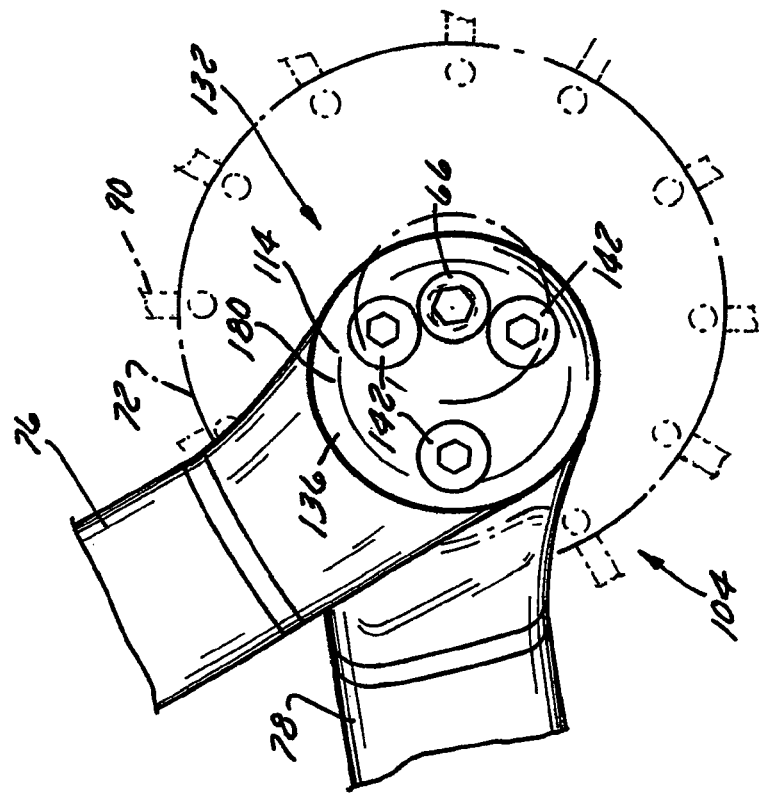
FIGS. 5 and 6 are opposite lateral side elevation views of the rear wheel assembly shown in FIG. 4 with the wheel mount assembly oriented to provide the greatest available distance between the axis of rotation of the crankset and a driven gear attached to the rear wheel assembly.
Figure 7:
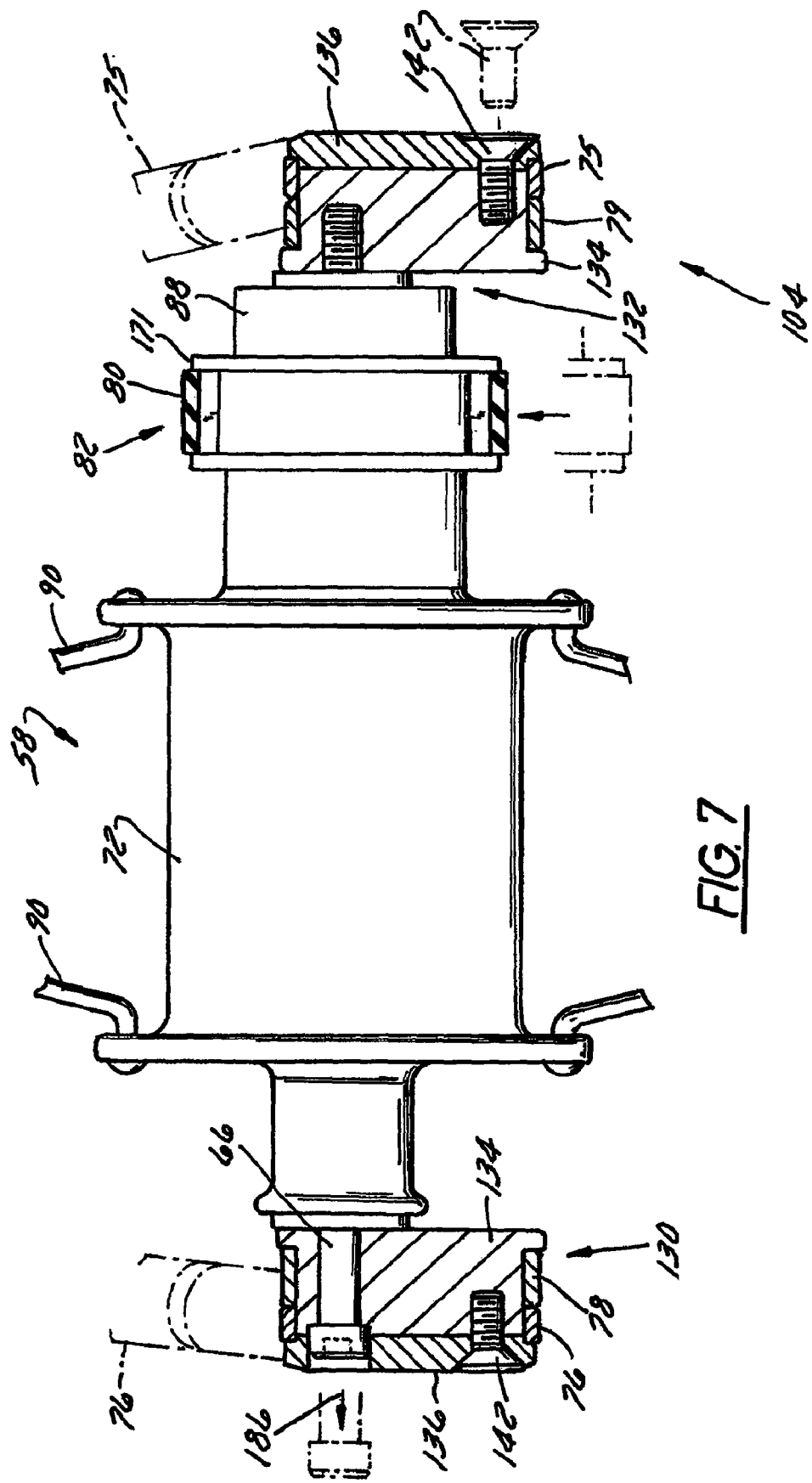
FIG. 7 is a plan view similar to FIG. 4 and shows the wheel mount assembly oriented so that the wheel axle is maintained at a more forward position as compared to the orientation shown in FIG. 4.
Figure 9:
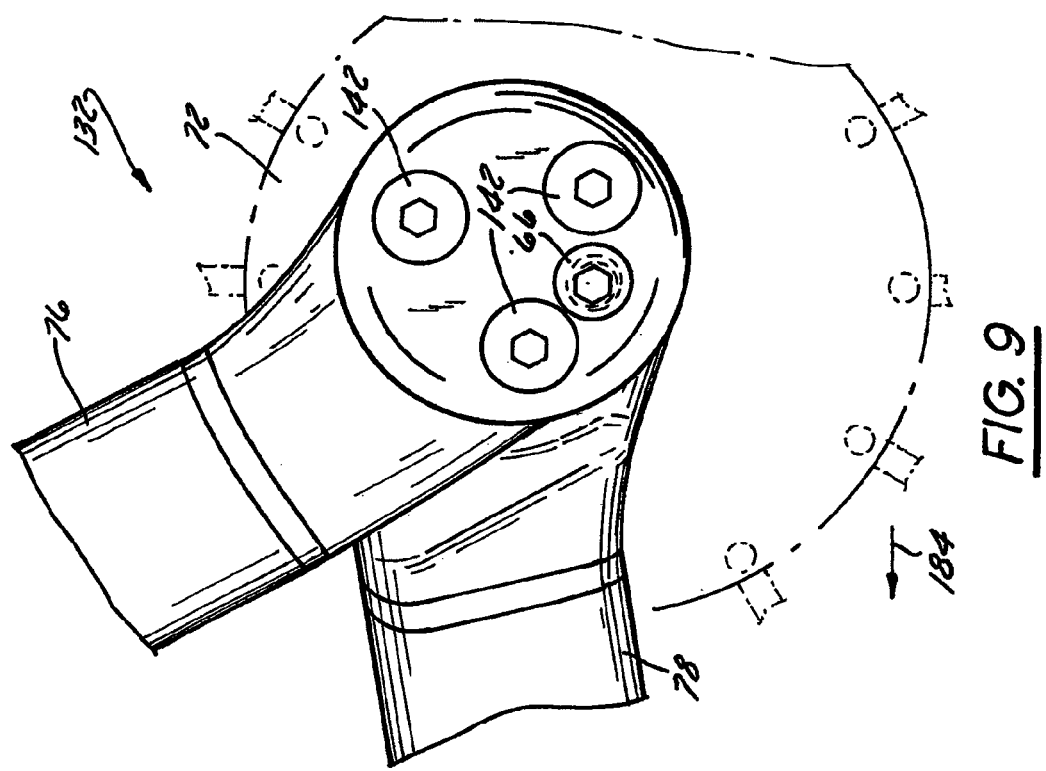
FIGS. 8 and 9 are views similar to FIGS. 5 and 6 and shown the orientation of the wheel mount assembly when the axle is positioned at the more forward position associated with FIG. 7.
Figure 8:
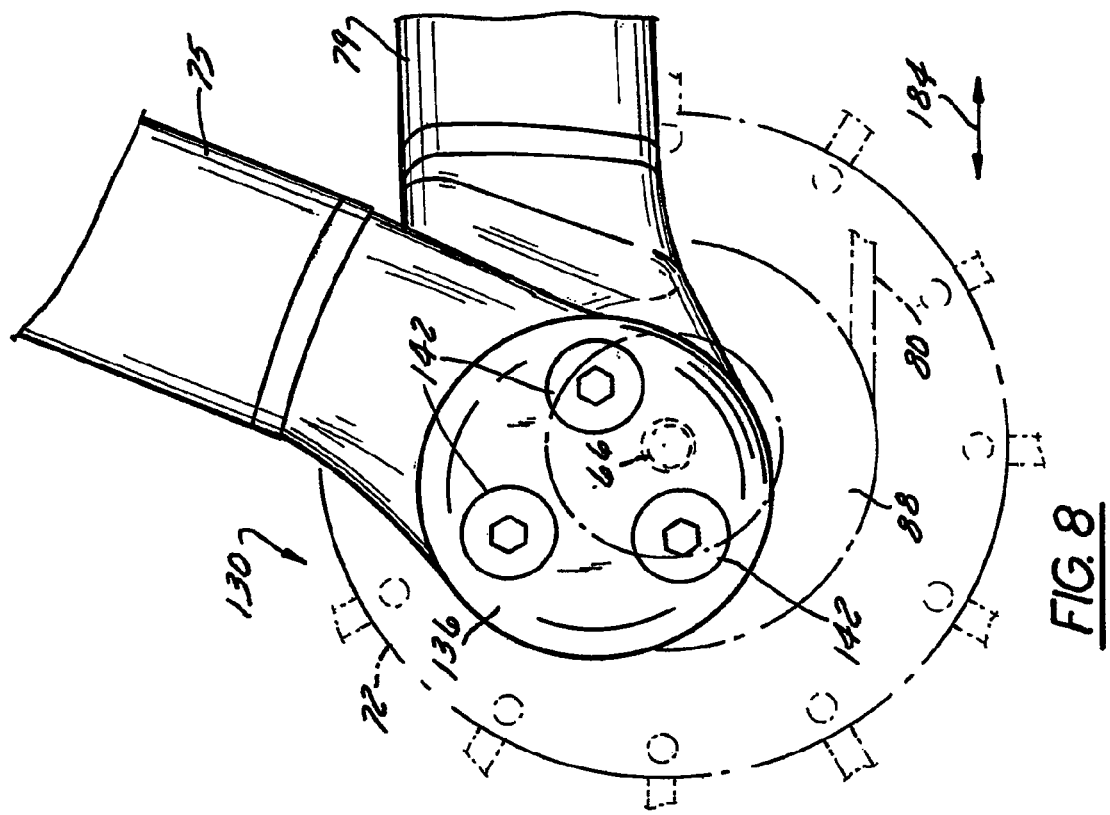

Referring to FIGS. 4-9, when bicycle 10 is configured for normal use, flexible drive 80 of drive train 82 is operatively engaged with a pulley or gear 171 of cassette 88. It should be appreciated that axle 66 is oriented in a more rearward position relative to bicycle 10 in FIGS. 4-6 as compared to the orientation shown in FIGS. 7-9. Those skilled in the art will appreciate that the more forward orientation axle 66 shown in FIGS. 7-9 is indicative of a shorter distance between provided between the drive and driven components of drive train 82. Preferably, drive train 82 is configured for operation with flexible drive members 80 having a length associated with an operating distance that can be attained throughout the moveable distance of axle 66. Is it envisioned that as the flexible drive member 80 wears or weathers, a user may periodically adjust the position of axle 66 relative to bicycle 10 so as to maintain a desired operation of drive train 82.

Figure 4:
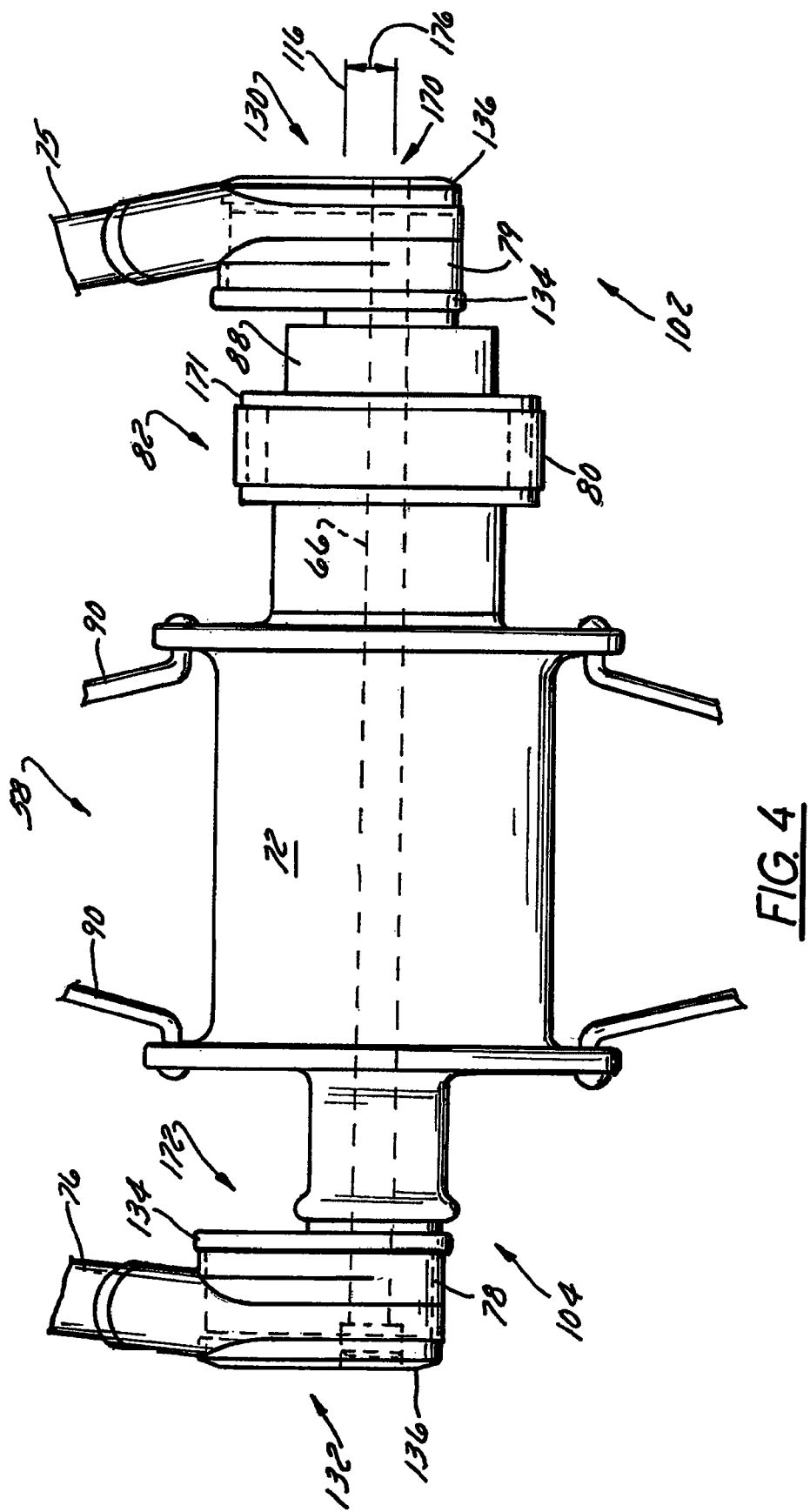
FIG. 4 is a plan view of the rear wheel assembly and shows an axle, shown in phantom, passing through the wheel assembly and oriented at a full rearward position associated with operation of the drive system.

Cassette 88 is attached to hub 72 such that translation of flexible drive 80 relative to pulley 171 and, independent of the position of axle 66 relative to bicycle 10, rotates hub 72 and thereby rear wheel assembly 58. Rear wheel assembly 58 is rotationally supported by axle 66. A drive side end 170 and a non-drive side end 172 of axle 66 are supported by respective drive side axle mount 130 and non-drive side axle mount 132. As shown in FIG. 4, an axis 174 of axle 66 is offset, indicated by arrow 176, relative to rotational axis 116 of axle mount assemblies 130, 132. Rotation of mount assemblies 130, 132 rotationally alters the position of axle 66 relative to openings 114 of stays 75, 76, 78, 79 and laterally translates axle 66, in an arcuate fashion, relative to crankset 84.

Figure 5:
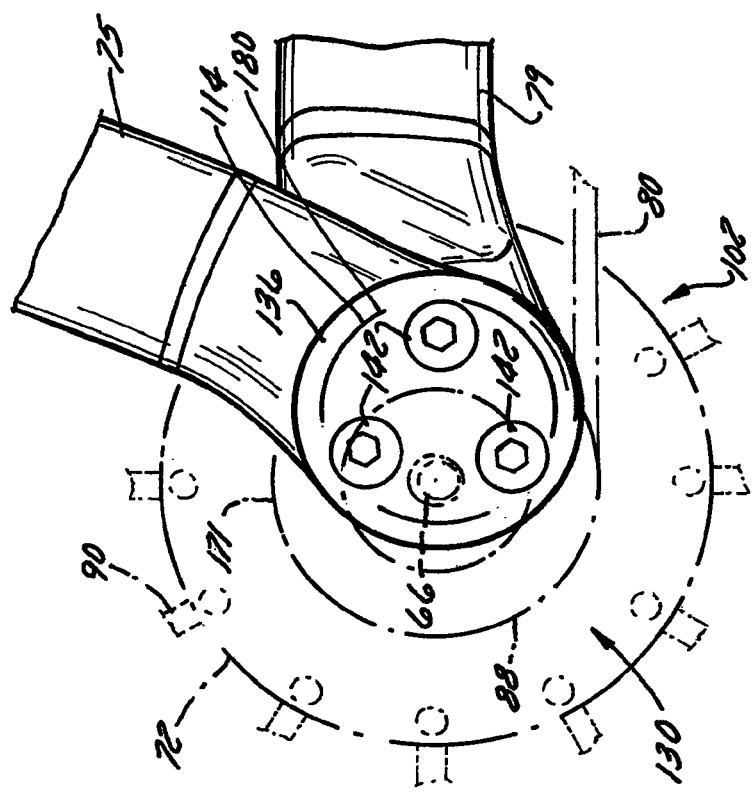

FIGS. 5 and 6 are elevational views of the generally opposite lateral outboard sides of the drive side axle mount assembly 130 and the non-drive side axle mount assembly 132 when axle 66 is positioned in a full rearward position. As shown in FIGS. 5 and 6, axle 66 is radially offset relative to an axis of rotation of drive side axle mount assembly 130 and non-drive side axle mount assembly 132. Said another way, axle 66 is offset toward a perimeter 180 of drive side and non-drive side axle mount assemblies 130, 132 so that rotation of the mount assemblies 130, 132 relative to stays 75, 76, 78, 79 translates axle 66 relative thereto.

Rotation of axle mount assemblies 130, 132 relative to stays 75, 7976, 78 also alters the orientation of cassette 88 relative to crankset 84 of drive train 82. Although axle 66 is shown in a full rearward position in FIGS. 5 and 6, is appreciated that axle 66 may be secured to stays 75, 79, 76, 78 at a more forward orientation, such as that shown in FIGS. 7-9, depending upon the operating length of flexible drive member 80. That is, it is envisioned that axle 66 be gradually rotated to the full rearward orientation shown in FIGS. 4-6 as flexible drive member 80 wears and/or otherwise lengthens. It is appreciated that a belt flexible drive may have different operating lengths as a function of ambient conditions such as temperature. When axle 66 is located in the full rearward position shown in FIGS. 5 and 6, and a desired operative association between flexible drive member 80 and cassette 88 can no longer be achieved indicated by excessive slipping or jumping of flexible drive member 80, flexible drive member 80 is sufficiently worn or misshapen so as to require replacement and/or adjustment (such as the removal of a chain link).

FIGS. 7-9 show axle 66 oriented in a more forward orientation as compared to the arrangement shown in FIGS. 4-6. Although not required, the forward translation of cassette 88 may improve the ease with which flexible drive member 80 can be removed and/or replaced. Alternatively, the configuration of axle 66 and mount assemblies 130, 132 shown in FIGS. 7-9 is indicative of an operating orientation associated with a flexible drive member 80 whose length and/or tension is less than the length and/or tension of the flexible drive member 80 associated with the orientation of axle 66 shown in FIGS. 4-6.

Loosening of fasteners 142 of the each of drive side axle mount assembly 130 and non-drive side axle mount assembly 132 allows each axle mount assembly 130, 132 to be rotated relative to the respective stays 75, 76, 79, 78 and allows axle 66 to translate in forward and rearward directions, indicated by arrow 184, relative to bicycle 10. Forward translation of axle 66 relative to bicycle 10 translates cassette 88 nearer to crankset 84 of drive train 82. For those users with insufficient grip or hand strength, such an orientation allows most flexible drives to be nearly freely removed from drive train 82 for replacement and/or adjustment.

As stated above, the more forward orientation of axle 66 shown in FIGS. 8-9 may also be indicative of a driving orientation associated with a shorter and/or shortened flexible drive member 80. That is, rotation of drive side and non-drive side axle mount assemblies 130, 132 relative to stays 75, 76, 78, 79 allows bicycle 10 to be configured for operation with some degree of variable length flexible drive members 80. Said another way, flexible drive member 80 can be tensioned simply by loosening fasteners 142 so that drive side and non-drive side axle mount assemblies 130, 132 can rotate relative to stays 75, 76, 78, 79 thereby allowing axle 66 to be translated in a rearward direction so as to increase the operating distance associated with crankset 84 and cassette 88.

Understandably, the operating range of the adjustability of drive train 82 could be increased by increasing the diameter of axle mount assemblies 130, 132 to increase the offset 176 of axle 66 from the axis of the mount assemblies 130, 132.

Referring to FIG. 7, if it is desired to remove rear wheel assembly 58 for servicing, such as replacement of tire 68, hub 72 can be removed from bicycle 10 without altering the orientation of axle 66 relative thereto. That is, rather than loosening fasteners 142 so that drive side and non-drive side axle mount assemblies 130, 132 can both be rotated relative to the respective stays 75, 79, 78, 76, axle 66 can be removed from axle mount assemblies 130, 132 without altering the orientation of the axle mounts 130, 132 relative to bicycle 10. Such a construction maintains the desired orientation of the drive train components for subsequent connection of wheel assembly 58.

As shown in FIG. 7, axle 66 can be loosened and translated in a lateral direction, indicated by arrow 186, relative to hub 72 such that wheel assembly 58 can be disengaged from between axle mount assemblies 130, 132. When it is desired to reengage wheel assembly 58 with bicycle 10, the wheel assembly can be re-associated with bicycle 10 via reinsertion of axle 66. Without altering the orientation of axle mounts 130, 132 relative to bicycle 10, wheel assembly 58 can be removed and replaced in a manner that does not alter the configuration of the drive train 82. Accordingly, wheel assembly 58 and drive train 82 can be independently adjusted and/or serviced.

Still referring to FIG. 7, rear dropout assembly 100 allows convenient and expedient separation of the bicycle frame in the event flexible drive member 80 needs replacement in a non-broken manner. Understandably, most belts are provided in a continuous inseparable loop so separation of the loop is not possible. Similarly, depending on the configuration of a particular bicycle's drive system, it is occasionally more efficient to remove a rear wheel assembly than to attempt to separate a chain. Such service strategies can further be dictated by the availability of the specialized tools commonly associated with separating or "breaking" the continuous loop of the chain. Flexible drive member 80 of the present invention can be replaced in a particularly efficient manner without altering or fully removing wheel assembly 58 from bicycle 10.

As shown in FIG. 7, in the event the belt or chain associated with flexible drive 80 needs to be removed, fasteners 142 can be removed from drive side axle mount assembly 132 so that inboard and outboard mounts 134, 136 can be separated. Once separated, the rearward portion of seat stay 75 can be moved from the operating position adjacent chain stay 79. That is, the drive side rear dropout assembly can be separated so that flexible drive member 80 can pass into the area common closed by seat stay 75, chain stay 79, and seat tube 22 (FIG. 1). Said in another way, chain stay 79 can be passed into the loop closed by flexible drive member 80. The flexible drive member 80 can then be engaged for operation with each of cassette 88 and crankset 84 in a manner wherein the orientation of the respective components of drive train 82 does not change but for the replacement of drive member 80.

Understandably, after replacement of drive member 80, should drive train 82 need adjustment for proper tensioning of flexible drive member 80, after drive side axle mount assembly 132 is reassembled, but prior to complete tightening of fasteners 142, fasteners 142 of non-drive side axle mount assembly 130 can be loosened so that axle 66 and axle mount assemblies 130, 132 can be rotated relative to bicycle 10 thereby tensioning or otherwise orienting flexible drive member 80 for desired operation.

Regardless if flexible drive member 80 is provided as a chain or a belt, axle mount assemblies 130, 132 allow mounting of wheel assembly 58 in a manner that allows for the efficient and independent servicing of drive train 82, servicing of wheel assembly 58, and orientation of axle 66 relative to bicycle 10. Furthermore, axle 66 and wheel mount assemblies 130, 132 can be fully manipulated with a reduced number of tools and/or tools that even most unskilled users can be comfortable using. Accordingly, bicycle 10 provides a wheel and drive system that is serviceable by novice bicycle users and that is quickly and efficiently adjustable by more mechanically inclined users and/or users with greater experience.

Another feature of dropout assemblies 102, 104 relates the use of the dropout system with bicycles of different geometric proportions. The generally circular interaction between each of seat stays 75, 76 and respective chain stays 79, 78 allows the stays to be provided at a variety of angles prior to connection of the stays to frame 14. Accordingly, axle mount assemblies 102, 104 can be quickly integrated across a wide product platform that includes bicycles intended for different uses, such as off-road and road bicycles, as well as a variety of similar styled bicycles provided in a variety of sizes generally specific to user sex and/or stature. Accordingly, in addition to enhancing the serviceability and adjustability of a bicycle drive train, axle mount assemblies 102, 104 also improve manufacturing efficiency.

Therefore, one embodiment of the invention includes a bicycle wheel support assembly that has a chain stay and a seat stay and an axle mount opening formed in each thereof. The support assembly includes an axle mount assembly that has a first portion that engages the chain stay from a first direction and a second portion that engages the seat stay from a second direction opposite the first direction such that the axle mount assembly secures the chain stay to the seat stay when the axle mount assembly is engaged therewith. The chain stay and the seat stay are separable when the axle mount assembly is removed therefrom. An axle is engaged with a peripheral location of the axle mount assembly such that rotation of the axle mount assembly alters a position of the axle relative to the axle mount opening.

Another embodiment of the invention that includes or is combinable with one or more of the features or aspects of the embodiment above includes a bicycle wheel support assembly having a chain stay, a seat stay, and a support opening formed at an overlapping portion of the chain stay and the seat stay. The support opening has an axis that is oriented in a crossing direction relative to a longitudinal axis of a respective chain stay and seat stay. A first support and a second support are rotatably engaged with the support opening from generally opposite directions along the axis of the open and secure together the overlapping portions of the chain stay and the seat stay. An axle opening is formed in at least one of the first support and the second support at a position that is offset in a radial direction from the axis of the support opening. The axle opening is configured to cooperate with a wheel axle so that the wheel axle can be removed from the opening without interfering with an orientation of the axle opening relative to the chain stay and the seat stay.

Another embodiment of the invention that includes or is combinable with one or more of the features or aspects of the embodiments above includes a method of mounting a bicycle wheel. At least a driven side of a rear wheel assembly of a bicycle is formed with a chain stay and a seat stay that have separable rear end portions. An axle mount is provided that connects the rear end portions of the chain stay and the seat stay. An axle is engaged with the axle mount so that the axle mount can be rotated relative to the rear end portions of the chain stay and the seat stay to define an operating position of the axle.

The present invention has been described above in terms of the preferred embodiment. It is recognized that various alternatives and modifications may be made to these embodiments which are within the scope of the appending claims.

What is claimed is:

1. A bicycle wheel support assembly comprising:
a chain stay and a seat stay each having an axle mount opening;
an axle mount assembly having a first portion that engages the chain stay from a first direction and a second portion that engages the seat stay from a second direction that is opposite the first direction such that the axle mount assembly secures the chain stay to the seat stay when the axle mount assembly is engaged therewith and so that the chain stay and the seat stay are separable when the axle mount assembly is removed therefrom; and
an axle engaged with a peripheral location of the axle mount assembly so that the axle mount assembly offsets the axle in a radial direction from the chain stay and the seat stay and so that rotation of the axle mount assembly alters a position of the axle relative to the axle mount opening independent of engagement of the axle with the axle mount assembly.

2. The assembly of claim 1 further comprising at least one fastener that secures the first and the second portions of the axle mount assembly together.

3. The assembly of claim 1 wherein the axle removably engages both of the first and second portions of the axle mount assembly.

4. The assembly of claim 3 wherein the axle can be removed from the axle mount assembly without altering a position of the axle mount assembly relative to the chain stay and seat stay.

5. The assembly of claim 1 wherein the axle one of passes slidably through the axle mount assembly and threadingly engages at least one of the first portion and the second portion of the axle mount assembly.

6. The assembly of claim 1 further comprising another chain stay, another seat stay, and another axle mount assembly engaged with an opposite end of the axle in a configuration that mirrors the first axle mount assembly.

7. The assembly of claim 1 wherein each of the first portion and the second portion of the axle mount assembly have a first section that passes through a respective axle mount opening and a second section that has a larger diameter than a diameter of the respective axle mount opening.

8. A bicycle wheel support assembly comprising:
a chain stay;
a seat stay;
a support opening formed at an overlapping portion of the chain stay and the seat stay, the support opening having an axis that is oriented in a crossing direction relative to a longitudinal axis of a respective chain stay and seat stay;
a first support and a second support rotatably and removably engaged with the support opening from generally opposite directions along the axis and selectively securing together the overlapping portions of the chain stay and the seat stay; and
an axle opening formed in at least one of the first support and second support at a position that is offset in a radial direction from the axis of the support opening and configured to cooperate with a wheel axle so that the wheel axle can be removed from the opening without interfering with an orientation of the axle opening and a position of the first support and second support relative to the chain stay and the seat stay.

9. The assembly of claim 8 further comprising another chain stay, another seat stay, and a third support and a fourth support that cooperate with another support opening formed at an overlapping portion of the another chain stay and another seat stay.

10. The assembly of claim 9 further comprising another axle opening formed in at least one of the third support and the fourth support and positioned to be aligned with the axle opening formed in at least one of the first support and second support.

11. The assembly of claim 10 further comprising an axle that slidably cooperates with one of the axle openings and threadingly cooperates with the other axle opening.

12. The assembly of claim 9 wherein each support includes a first portion having a diameter that generally corresponds to a diameter of the support opening and a second portion having a diameter that is larger than the support opening.

13. The assembly of claim 9 wherein the support opening and another support opening are fully bound by the respective chain stay and seat stay and a portion of the support opening in a respective seat stay is about the same size as a portion of the support opening in a corresponding chain stay.

14. The assembly of claim 13 wherein each support opening and each support has a complimentary circular cross-section.

15. The assembly of claim 8 further comprising a wheel assembly having a hub that is slidably engageable with an axle engaged with the axle opening.

16. A method of mounting a bicycle wheel comprising:
forming at least a driven side of a rear wheel assembly with a chain stay and a seat stay that have separable rear end portions;
providing an axle mount that connects the rear end portions of the chain stay and the seat stay and has an axle opening and that allows independent positioning of the axle opening relative to the chain stay and seat stay and separation of the rear end portions;
engaging an axle with the axle opening of the axle mount; and
rotating the axle mount relative to the rear end portions of the chain stay and the seat stay to define an operating position of the axle.

17. The method of claim 16 further comprising passing a drive member between the separable rear end portions of the chain stay and the seat stay.

18. The method of claim 17 further comprising forming the drive member as one of a chain and a belt.

19. The method of claim 16 further comprising forming a non-driven side of the rear wheel assembly as a mirror image of the driven side.

20. The method of claim 16 further comprising offsetting an axis of the axle relative to an axis of rotation of the axle mount so that rotation of the axle mount relative to the rear end portions alters a linear distance between the axis of the axle and an axis of rotation of a pedal.

* * * * *